3,291,997
METHOD AND APPARATUS FOR TRACING FLUID FLOW THROUGH POROUS MEDIA
Edward L. Albenesius, Aiken, Clyde C. Haskell, North Augusta, and Richard H. Hawkins, Aiken, S.C., assignors to the United States of America as represented by the United States Atomic Energy Commission
Filed Nov. 13, 1963, Ser. No. 323,517
5 Claims. (Cl. 250—83.1)

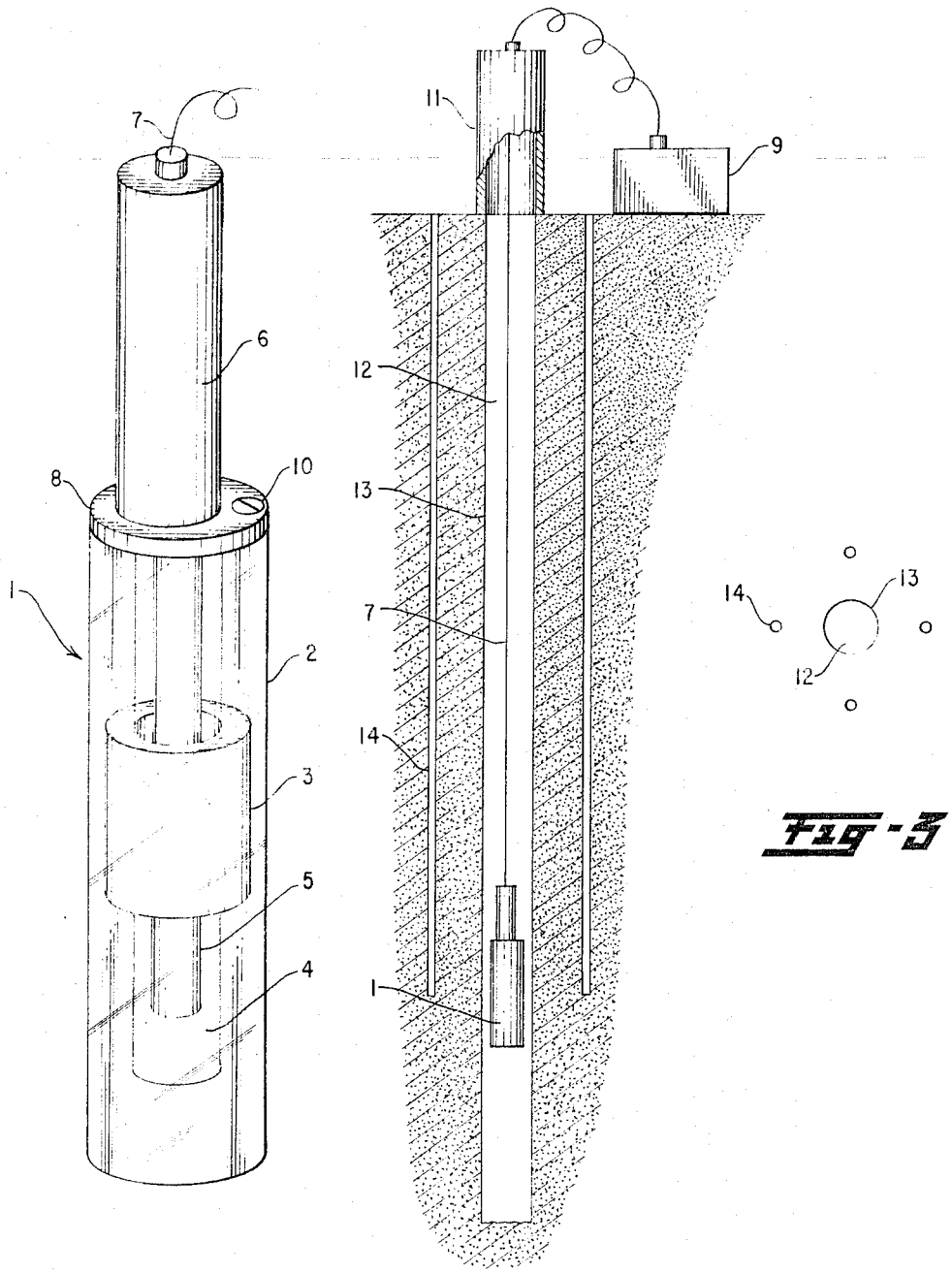

This invention is drawn to a method and apparatus for measuring liquid migration in porous media and more particularly to such a method and apparatus for measuring the flow of water through soils.

The study of soil moisture movement in recent years has largely been carried out in the laboratory because of the inadequacy of existing field methods. The results of such studies can only infer, since this is an indirect method, the actual soil moisture movement in the field. A tracing or tracking method which can be applied at the field site would have definite advantages over the indirect methods.

These studies and measurements are important in the soil science field today because, inter alia, they provide a basis for predicting the movement of soil moisture and the migration of radioactive isotopes from buried radioactive waste.

It has been found that to trace or track the movement of soil moisture a suitable material is needed that will migrate at the same rate as water. Tracers, made of substances that have been tagged with radioactive isotopes, such as water having radioactive substances dissolved therein, are unsatisfactory because these substances are absorbed by the soil, or undergo an ion exchange by the soil, which renders them unsuitable since they do not migrate at the same rate as water. What is needed is to tag the water in a manner such that the chemical characteristics are the same, but the nuclear characteristics are modified to render the water positively detectable and not subject to depreciation in use. Tritium oxide moves through soil like ordinary water, but is unsuitable for field work because its weak radiation makes it essentially imposible to detect in situ.

It is therefore an object of this invention to provide a method and apparatus whereby an accurate determination of the flow of water through soil may be made.

It is a further object of this invention to provide an apparatus and method which can be utilized at the field site to trace the movement of water through soil.

Another object of the invention is to provide an apparatus which can be easily conveyed to a field site and can be used with a minimum amount of effort to trace the flow of water through the soil.

Further objects and advantages of the invention will become apparent to those familiar with the art upon a reading of the following specification when taken in conjunction with the attached drawings wherein:

FIG. 1 is an isometric view of a probe designed in accordance with the invention;

FIG. 2 is a schematic view of the probe of FIG. 1 and its associated parts to illustrate the manner of its use and the method of the invention;

FIG. 3 is a horizontal cross sectional view of FIG. 2 showing the relative positions of the instrument access hole and tracer holes of a typical installation at a field test site.

The method of the invention comprises generally depositing heavy water ($D_2O$) within the soil and tracing the flow of the heavy water therethrough with a probe. The probe of the invention comprises a source of radioactivity having a gamma energy greater than the threshold value for the $(\gamma,n)$ reaction with deuterium in $D_2O$ and a slow neutron detector for detecting the photoneutrons produced by this reaction which are thermalized and scattered by the soil to the probe. The probe is manipulated within the soil to measure the relative concentration of the tracer material at different depths.

With reference to FIG. 1, the probe which is designated generally by numeral 1 consists of an elongated cylinder (in the preferred embodiment) made of a material which is not appreciably activated by thermal neutrons, is pervious to neutrons and gamma rays and will not attenuate either one appreciably, such as polystyrene. Substantially centrally located between the ends of and within said cylinder 2 is a hollow cylinder 3 of a material which emits gamma rays having a sufficient energy to cause the $(\gamma,n)$ reaction with deuterium in the heavy water. Cylinder 3 is preferably sodium hydroxide (NaOH) wherein the sodium contains a sufficient amount of the isotope $Na^{24}$. The method is based on the reaction:

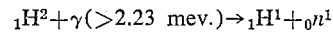
$$_1H^2 + \gamma(>2.23 \text{ mev.}) \rightarrow {}_1H^1 + {}_0n^1$$

The isotope $Na^{24}$ emits gamma radiation of 2.75 mev. and is produced by neutron activation of the NaOH. The threshold energy for the $(\gamma,n)$ reaction with deuterium in $D_2O$ is 2.2 mev. as given, for example, in "Principles of Nuclear Reactor Engineering," by Samuel Glasstone, D. van Nostrand Company, Inc., New York, N.Y., 1955, p. 80, sections 2.74–2.76. In the preferred method, the NaOH cylinder 3 is precast and then molded, or assembled, within the polystyrene cylinder 2, after which it is irradiated with thermal neutrons to produce the $Na^{24}$.

The probe has a concentric bore 4 extending through the upper end and through cylinder 3 to accommodate a $BF_3$ neutron detector tube 5 which is insertable therein as will be further described below. The $BF_3$ neutron detector tube 5 is in the form of an elongated cylinder and is of the conventional type having long life, good sensitivity, a high degree of accuracy and fast response. Extending from the upper end of cylinder 2 is a cylindrical housing 6 for a preamplifier unit which is mechanically and electrically connected to the detector tube 5, and which is also electrically connected, through flexible cable 7 extending from the upper end thereof, to a portable radiation indicating and/or recording device 9 (FIG. 2). These electrical and electronic components amplify and indicate the signal produced by the detector tube 5 and are commercially available equipment, the particular designs of which are not intended to constitute a part of this invention. The preamplifier housing 6 has an integral flanged end 8 to facilitate removably fastening the housing together with the preamplifier held therein to the polystyrene cylinder 2, such as by screws 10 for example. When the housing is in place for use, the $BF_3$ tube extends from the end of the preamplifier into the bore 4 and through the cylinder 3 as indicated in FIG. 1.

The method of the invention and the manner of utilizing the probe of FIG. 1 will now be described with reference to FIGS. 2 and 3. To conduct a test in the field, it is necessary to transport the probe assembly 1 and radiation recorder 9 to the test site. Since the probe contains a source of radiation, it must be enclosed when not in use within a suitable radiation shield so that it can be handled and transported safely. The shield may be of any suitable shape and material to provide the desired characteristics, and is schematically illustrated at 11 as a hollow lead cylinder in which the probe assembly 1 is held during transportation and storage. At the point where the test is to be made the soil is augered to a predetermined depth to provide a substantially vertical bore 12 which may be lined with a casing or aluminum, or other suitable material, 13 which serves as the probe access tube. A plurality of smaller holes 14 substantially equally spaced from the access tube are augered in the earth substantially vertically to a predetermined depth less than the depth of the access tube and above the water table for a purpose which will become apparent. Into the bottom of each of the holes 14 is placed a predetermined amount of heavy water by means of a plastic tube inserted in the holes. The holes 14 are then backfilled and carefully packed with the soil taken from them. The shield cylinder 11, with the probe held therein, is then placed over the access tube 13 and the probe is lowered through the bottom of the shield into the access tube by manipulating the flexible cable 7 which is preferably slidably disposed through the top of shield 11. The probe is then moved, in the vicinity of the depth of the deposit of heavy water, through predetermined vertical intervals (for example 1 inch). Gamma rays emanating from the NaOH source 3 pass through the access tube into the surrounding earth. When these gamma rays interact with the deuterium in the heavy water deposit, photoneutrons are given off. Many of these photoneutrons are attenuated and backscattered by the soil to the probe where they are detected by the $BF_3$ detector tube 5 and, through the electrical components, are indicated on unit 9. The highest count rate is observed at the depth of greatest relative concentration of the $D_2O$ tracer. Successive observations of this type are made over a period of time to determine the vertical movement and rate of movement of the $D_2O$ tracer in the soil. Lateral movement of the $D_2O$ tracer is also detectable by the method.

The rate at which the $D_2O$ tracer moves through the soil depends principally upon the permeability of the soil and factors affecting moisture content, such as infiltration of rainfall and seepage from liquid basins. Any flow of natural water, or aqueous liquid from a storage basin, in the vicinity of the tracer material will affect the rapidity with which the $D_2O$ tracer moves through the soil.

The particular sizes and relative spacings of the augered holes 12 and 14 can of course be varied, the size of hole 12 being dependent mainly upon the size of the probe 1 so as to provide ease of travel of the lattter therethrough. In addition, it has been found that the holes 14 of 1½ inch diameter, equally spaced, parallel to and 3 inches radially spaced outwardly from the access tube work well with a deposit of $D_2O$ at the bottom thereof in the amount of 110 milliliters per hole for a total of 440 milliliters of $D_2O$. For this amount of $D_2O$ at these relative distances, the cylinder 3 may be made of reagent grade NaOH, compacted to about its theoretical density, having the following approximate size: length—2¾ inches; I.D.—1½ inches; O.D.—2⅜ inches. This cylinder is irradiated with thermal neutrons to produce about 50 mc. of $Na^{24}$. The corresponding size for the probe cylinder 2 may be approximately as follows: length —8¾ inches; O.D.—2¾ inches. The bore 4 should then be about 1⅛ inches in diameter and 8 inches long to accommodate a commercially available $BF_3$ tube 5 of proper size.

Other obvious modifications to the process and apparatus of the invention and substitutions of materials may appear to those familiar with the art and accordingly it is not intended that this invention be limited to the specific embodiment disclosed herein but rather by the scope of the appended claims.

What is claimed is:

1. A method of tracing fluid flow in soil comprising drilling a plurality of substantially equally spaced holes in a circular array to a predetermined depth above the water table in the soil, drilling an access hole in the approximate center of said plurality of holes and to a greater depth, depositing in each of said plurality of holes a quantity of $D_2O$, placing a probe comprising an integral gamma radiation sources and neutron detector in said access hole, said gamma radiation having an energy greater than the threshold value for the $(\gamma,n)$ reaction with deuterium, moving the probe in the vicinity of and relative to the depth of said plurality of holes, and measuring the neutrons produced by the $(\gamma,n)$ reaction with said detector at various positions of said probe over a period of time.

2. The method of claim 1 wherein four substantially equally spaced holes are drilled in a circular array and said access hole is lined with aluminum.

3. The method of claim 1 wherein said quantity of $D_2O$ is 110 milliliters per hole, said source of gamma radiation is $Na^{24}$, and the probe is moved vertically to determine the relative concentrations of $D_2O$ at different depths.

4. A probe for detecting heavy water in soil comprising an annular cylinder of NaOH wherein the sodium constituent is substantially the isotope $Na^{24}$, a cylindrical neutron detector tube of greater length than and extending coaxially through said NaOH cylinder, being encased in a gamma ray and neutron permeable material.

5. The device of claim 4 wherein said permeable material is polystyrene in the shape of an elongated cylinder, said neutron detector is a $BF_3$ tube, and a preamplifier is attached to one end of said probe and electrically connected to the $BF_3$ tube.

References Cited by the Examiner

UNITED STATES PATENTS

| | | | |
|---|---|---|---|
| 2,390,931 | 12/1945 | Fearon | 250—83.6 |
| 2,504,888 | 4/1950 | Siegert | 250—83.6 |
| 2,581,412 | 1/1952 | Herzog | 250—83.6 |
| 3,002,091 | 9/1961 | Armstrong | 250—106 |
| 3,019,341 | 1/1962 | Monaghan | 250—106 |

FOREIGN PATENTS 125,909   3/1960   Russia.

OTHER REFERENCES

Nuclear Dynamics, Experimental by Livingston et al., Review of Modern Physics, vol. 9, No. 3, July 1937, pp. 351-354.

RALPH G. NILSON, *Primary Examiner.*

JAMES W. LAWRENCE, *Examiner.*